W. E. HOSCH AND D. TURNER.
A. M. HOSCH, ADMINISTRATRIX OF W. E. HOSCH, DEC'D.
CLOTH MEASURING OR COMPUTING MACHINE.
APPLICATION FILED AUG. 2, 1920.

1,434,999.

Patented Nov. 7, 1922.

Inventor:
Douglas Turner,
Annie Mae Hosch, Adm.
By Elliott & Ammen
Attorneys.

W. E. HOSCH AND D. TURNER.
A. M. HOSCH, ADMINISTRATRIX OF W. E. HOSCH, DEC'D.
CLOTH MEASURING OR COMPUTING MACHINE.
APPLICATION FILED AUG. 2, 1920.
1,434,999.
Patented Nov. 7, 1922.
3 SHEETS—SHEET 2.
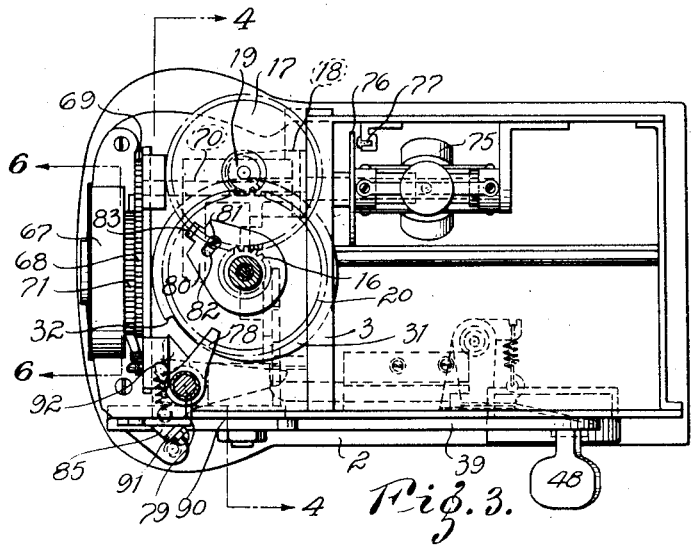
Fig. 3.
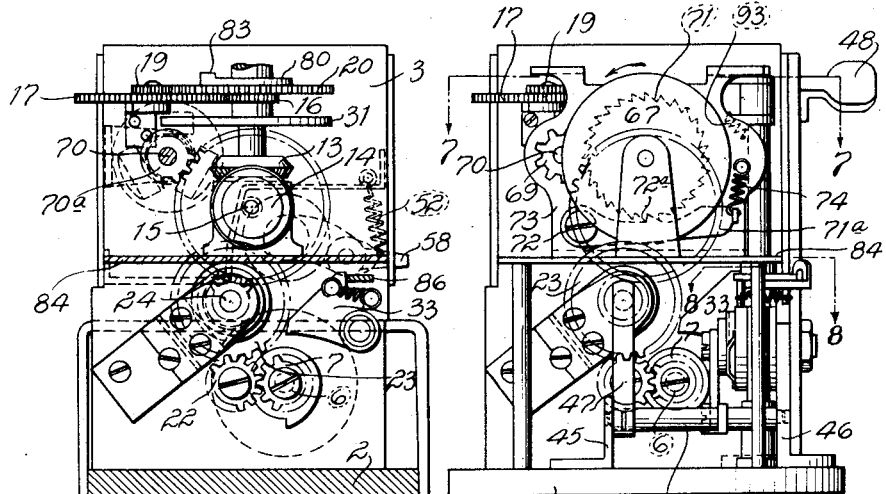
Fig. 4.   Fig. 5.
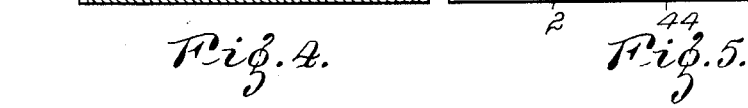
Fig. 6.
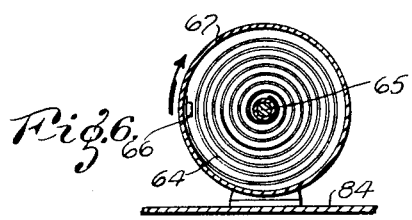
Inventor:
Douglas Turner.
Annie Mae Hosch, Admt.
By Elliott & Ammen
Attorneys.

W. E. HOSCH AND D. TURNER.
A. M. HOSCH, ADMINISTRATRIX OF W. E. HOSCH, DEC'D.
CLOTH MEASURING OR COMPUTING MACHINE.
APPLICATION FILED AUG. 2, 1920.
1,434,999.
Patented Nov. 7, 1922.
3 SHEETS—SHEET 3.
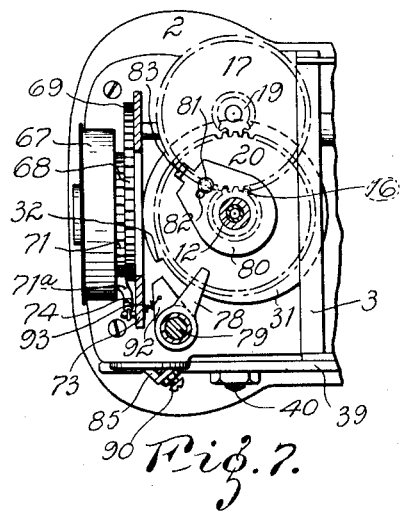
Fig. 7.
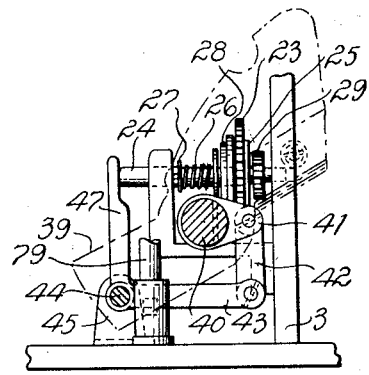
Fig. 9.
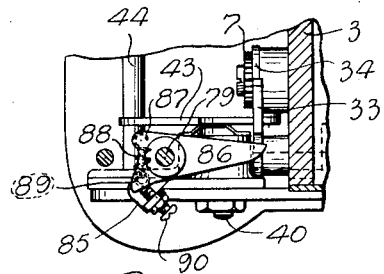
Fig. 8.
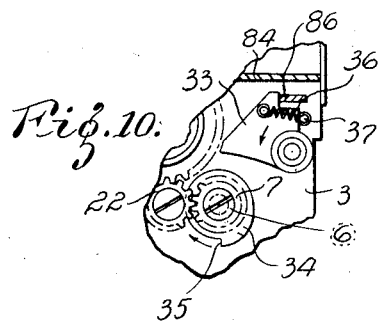
Fig. 10.
Fig. 11.
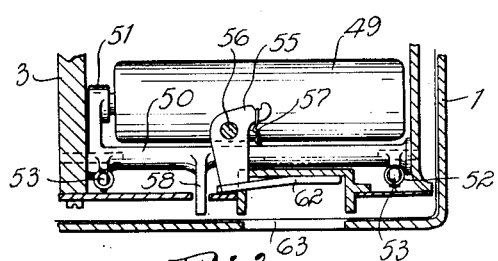
Fig. 12.
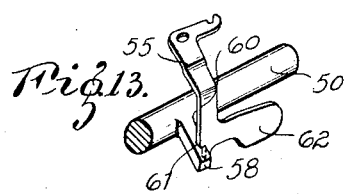
Fig. 13.
Inventor
Douglas Turner.
Annie Mae Hosch. Admx.
By Elliott & Ammen
Attorneys.

Patented Nov. 7, 1922.

1,434,999

UNITED STATES PATENT OFFICE.

WALTER E. HOSCH, DECEASED, LATE OF ST. LOUIS, MISSOURI, BY ANNIE MAE HOSCH, ADMINISTRATRIX, OF ST. LOUIS, MISSOURI, AND DOUGLAS TURNER, OF ST. LOUIS, MISSOURI, ASSIGNORS TO MEASUREGRAPH COMPANY, OF ST. LOUIS, MISSOURI, A CORPORATION.

CLOTH MEASURING OR COMPUTING MACHINE.

Application filed August 2, 1920. Serial No. 400,797.

*To all whom it may concern:*

Be it known that WALTER E. HOSCH, deceased, late a citizen of the United States, residing at St. Louis and State of Missouri, did in his lifetime jointly with DOUGLAS TURNER, a citizen of the United States, residing in St. Louis and State of Missouri, invent new and useful Improvements in Cloth Measuring or Computing Machines, of which the following is a specification.

This invention relates to fabric measuring and cost computing machines, such as used in selling cloth, ribbons, etc., at retail. These machines are usually constructed with indicating mechanism which includes charts carrying numbers for indicating the charges to be made for the fabric measured off. They also usually include a dial with which co-operate hands or pointers which indicate the length of the fabric measured. If desired, of course, such a dial may be provided with any of the computing tables of figures now known to the art which will enable the pointers to indicate the charge to be made for the goods as well as to indicate the length of the fabric. These machines also usually include means for marking the fabric after it has been measured to indicate the point where it is to be cut off. It is also usual to provide these machines with a push button, which when operated, will effect the return of the indicating mechanism to zero. The general object of the present invention is to produce a machine of this kind in which the return of the indicating mechanism to zero is effected automatically by the operation of the marking means; the marking means is also constructed so as to effect the raising of the presser roller to enable the same to be latched in its raised position above the measuring roller, thereby making the machine ready to receive the fabric to be measured. A further object of the invention is to provide improved means for arresting the measuring roller at the limit of the measuring movement and for stopping the indicating mechanism at the zero position.

Further objects of the invention will appear hereinafter.

The invention consists in the novel features, and in the general combination of parts to be particularly described hereinafter, all of which contribute to produce a simple and efficient cost computing or fabric measuring machine. A preferred embodiment of our invention will be particularly described in the following specification, while the broad scope of our invention will be pointed out in the appended claims.

In the drawing,

Figure 3 is a plan and partial section;

Figure 4 is a vertical section taken about on the line 4—4 of Figure 3 and partly broken away;

Figure 5 is an end elevation of the machine removed from its casing, certain parts being broken away;

Figure 6 is a vertical section taken about on the line 6—6 of Figure 3;

Figure 7 is a section taken about on the line 7—7 of Figure 5, certain parts being broken away;

Figure 8 is a section taken about on the line 8—8 of Figure 5;

Figure 9 is a vertical section through the shaft of the marking means, certain parts being broken away; this view illustrates the details of means which may be employed for effecting the return of the indicating mechanism to zero;

Figure 10 is a fragmentary view, showing certain parts in elevation and others in section and partly illustrating the details of means which may be employed for arresting the measuring roller at the limit of the measuring movement;

Figure 11 is a detail of a bracket plate which constitutes a feature of the invention;

Figure 12 is a horizontal cross section through the machine at about the level of the presser roller and particularly illustrating details of the mounting of the presser roller and the latching means for holding the presser roller away from the measuring roller; and Figure 13 is a perspective further illustrating details of the latching means.

Figure 1:
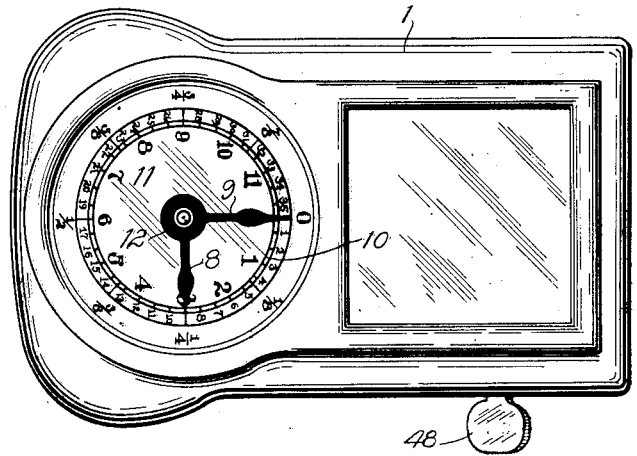
Figure 1 is a plan of the machine embodying our invention.

The machine comprises a casing or case 1 which fits over the entire mechanism of the instrument; the frame of the machine includes a base plate 2 and a vertical frame plate 3 which extends up from the base plate. In the lower portion of the casing 1 there is mounted a measuring roller 4, the upper face of which is located in a gap or throat 5 through which the fabric is pulled in the measuring operation. We provide a pinion 7 (see Fig. 4), rigid with roller 4 and located on the opposite side of the vertical frame plate 3 from the roller 4. This pinion drives the indicating mechanism of the instrument which includes a pair of hands 8 and 9 (see Fig. 1), the former of which co-operates with the large numbers on a circular scale 10 on a dial 11. This hand or pointer 8 is a slow moving hand, while the hand or pointer 9 is a rapidly moving pointer and co-operates with the small numbers on the scale 10 which indicate yard fractions; these yard fractions are preferably ⅛, ¼, ⅜, etc. The dial indicated shows a scale adapting the instrument to measure 12 yards, that is to say, 12 yards is the limit of its measuring movement. While the pointer 8 is moving from the number 2 to the number 3 of the large dial, the pointer 9 will make one complete revolution on the dial. In addition to the yard fractions the scale may also include small numbers indicating inches.

The indicating mechanism also includes a vertical tubular shaft or spindle 12 which carries the pointer 9. The spindle 12 carries a bevel gear 13 at its lower end which is driven by a similar bevel gear 14 carried on a horizontal shaft 15 (see Fig. 2); the spindle 12 drives the pointer 8 through suitable reduction gearing which will now be described.

The spindle 12 carries a pinion 16 (see Fig. 3) which meshes with a large gear wheel 17 rotatably mounted on a bracket 18 attached to the vertical frame plate 3 (see Fig. 3); this gear wheel 17 carries a rigid pinion 19 that meshes with a large gear wheel 20 which is rotatably mounted on the spindle 12 and carries a hub 21, the upper end of which carries the slow moving pointer 8.

We provide driving mechanism for driving the indicating mechanism from the roller 4, that is to say, from the pinion 7 of the measuring roller, and this driving mechanism includes a clutch among other gearing, and will now be described. The pinion 7 drives a gear wheel 22 (see Fig. 4) that meshes with a gear wheel 23 just above it and mounted on a clutch shaft 24 (see Fig. 9). This clutch shaft carries a clutch which may be opened in any suitable manner by the marking means which marks the fabric after the fabric has been measured. We prefer to construct the clutch so that it may be opened by a sliding movement of the clutch shaft 24. For this purpose the gear wheel 23 performs the function of a clutch member. Through it the shaft 24 slides freely and carries a clutch member or disc 25 beyond the gear wheel 23. A coil spring 26 disposed around the clutch shaft 24 thrusts against a collar 27 on the clutch shaft and normally holds the clutch closed; the gear wheel 23 is rotatably mounted in a suitable bracket 28. This clutch is of substantially the same construction as that disclosed in the co-pending application Serial Number 310,753. The shaft 24 carries a loose pinion 29 which meshes with a large gear wheel 30 carried on the aforesaid shaft 15, (see Fig. 4); this pinion 29 is rigid with clutch member 25.

With this construction it is evident that the rotation of the measuring roller will be imparted to the pointers 8 and 9. The indicating mechanism also includes a zero stop wheel 31 which is provided with means such as a notch 32 in its edge which assists in stopping the indicating mechanism at zero in the returning movement after a measurement has been made. At the limit of the measuring movement the rotation of the measuring roller is automatically arrested. For this purpose, on the vertical frame plate 3, we provide a movable stop 33 and this stop is actuated at the end of the measuring movement to arrest the roller. In order to accomplish this, the roller shaft 6 carries means to co-operate with the stop, which means may consist of a disc 34 rigidly attached on the shaft 6 of the measuring roller adjacent to the pinion 7. This disc has an abrupt shoulder 35. By rocking the stop plate 33 on its pivot in the direction of the arrow in Figure 10 the end of this plate may be projected into the path of movement of the shoulder 35 which will stop the rotation of the measuring roller; the roller rotates in the direction indicated by the arrow near the stop disc 34. The stop plate 33 is normally held out of the path of the shoulder 35 by a small coil spring 36 which holds the rear edge of the plate up against the stop pin 37. The means for actuating this stop plate 33 at the end of the measuring movement will be described hereinafter.

The marking means and its mode of operation will now be described.

This marking means may consist as usual, of a shears comprising a movable blade 38 (see Fig. 2) attached to a lever 39 carried on a shaft 40, the movable blade 38 co-operating with a fixed blade 38ª so as to notch the edge of the fabric. Whenever the lever 39 is operated it actuates suitable means for sliding the clutch shaft 24 inwardly, which opens the clutch. For this purpose the inner end of the knife shaft 40 carries a rigid arm 41 to which is attached a link 42, the lower end of said link 42 being attached to an arm 43 (see Fig. 9) which extends from a horizontal rock shaft 44 mounted to rock in suitable brackets 45 and 46. On this rock shaft 44 is carried a rigid arm 47 which extends up so that its upper end engages the end of the stem or shaft 24. The knife lever 39 may be actuated at will by pressing upon a thumb head 48 which extends through an arcuate slot, (not illustrated) in the side of the casing.

Figure 2:
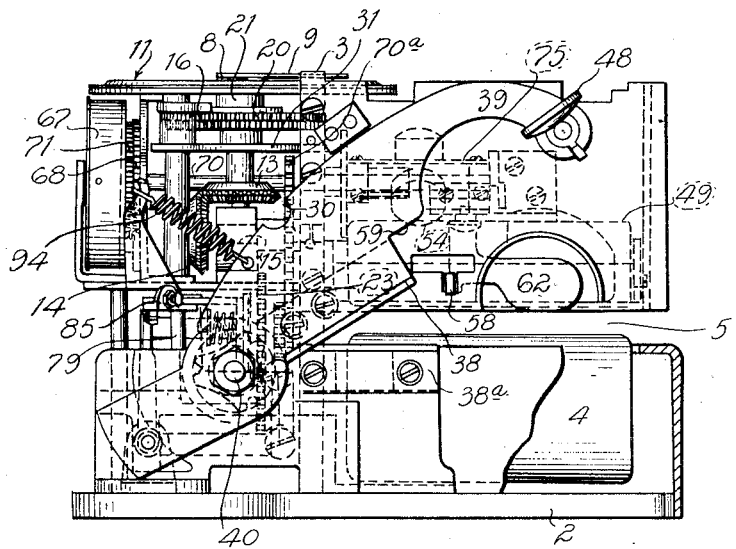
Figure 2 is a side elevation of the machine, removed from the casing, certain parts being broken away.

Co-operating with the measuring roller 4, we provide a presser roller 49 (see Figs. 2 and 12) and this presser roller is mounted so that it can swing away from the measuring roller or toward the measuring roller so as to come in contact with the measuring roller and co-operate with it in the measuring operation. For this purpose the presser roller is carried in a rocking frame comprising a rock shaft 50 having an arm 51 on which the presser roller is rotatably mounted. The ends of the rock shaft are suitably mounted in the frame of the machine. The presser roller is pulled toward the measuring roller by two coil springs 52 (see Figs. 4 and 12), the lower ends of which are attached to short arms 53 which project from the side of the shaft 50 of the presser roller frame. Latching means is provided for latching the presser roller in an elevated position away from the measuring roller to clear the gap 5 to permit the introduction of the fabric when it is to be measured. This latching means is illustrated in Figures 2, 12 and 13 and comprises a bracket 54 (see Fig. 2) in which a latch 55 is pivotally mounted on a suitable pin 56 (see Fig. 12); to this latch 55 a spring 57 is attached which tends to rotate the latch in a direction to engage with an arm 58 which projects outwardly from the rock shaft 50. The end of this arm 58 projects into the path of an edge 59 of the aforesaid lever 39 (see Fig. 2), and when the lever 39 is depressed the edge 59 engages the arm 58 and swings the arm 58 downwardly. As the arm 58 swings downwardly it moves along the vertical edge 60, of the latch 55 (see Fig. 13) and eventually comes below a shoulder 61 formed at the lower portion of the latch. When it arrives at this point, the spring 57 pulls the latch so as to engage the shoulder 61 over the arm 58 thereby holding the presser roller latch in its withdrawn or raised position. The latch 55 has a laterally projecting thumb plate 62 which is accessible through an opening 63 in the side of the casing (see Fig. 12). When the fabric has been properly positioned in the gap, the operator of the machine simply presses the thumb plate 62 and thereby disengages the latch 55 from the arm 58, whereupon the presser roller 49 descends onto the measuring roller.

We provide means for returning the indicating mechanism to zero when the clutch is open; this means is preferably in the form of a coil spring 64 (see Fig. 6), the inner end of which is attached rigidly to a tubular shaft 65, the outer end of the spring being secured at 66, to the inner face of the cylinder wall of a spring barrel or casing 67. The tubular shaft 65 carries rigidly a gear wheel 68 which meshes with a pinion 69 carried on a governor shaft 70 (see Fig. 3); at a suitable point on this governor shaft there is provided a pinion 70ª (see Fig. 2) which is driven from the aforesaid gear wheel 30. The reaction of the spring 64 tends to rotate the spring barrel 66 in a direction opposite to that indicated by the arrow in Figure 6, but the rotation of the barrel is prevented by means of a ratchet wheel 71 (see Fig. 5) which is rigid with the spring barrel, the lower edge of the ratchet wheel being engaged by a tooth 72ª on a pawl 71ª (see Fig. 5); this pawl is pivoted at 72 on a frame plate 73 and is pulled up against the ratchet wheel by a spring 74. With this construction, it is evident that the ratchet wheel 71 and the pawl 71ª afford means for effecting an adjustment or regulation of the tension of the spring 64. This will be evident from the fact that if the spring 64 should be rotated in the direction of the arrow in Figure 6, the tension on the spring can be increased. The force of the spring 64 is not sufficient to rotate the measuring roller and the gearing through which it drives the clutch. However, when the clutch is open, the spring operates to rotate the indicating mechanism back to zero. In order to prevent the indicating mechanism from racing in returning to zero, we provide the governor shaft 70 with a suitable centrifugal governor 75 having centrifugal weights which fly out when the speed increases, and in this way operate to pull the disc 76 on the governor shaft toward the right so that it will come against a friction brake 77 (see Fig. 3).

The mechanism for actuating the movable stop 33 (see Fig. 10) will now be described.

For this purpose we provide a finger 78 (see Fig. 3), and co-operating with this finger we provide means moving with the indicating mechanism which operates to strike the finger at the limit of the measuring movement. This rocks the finger on its axis of rotation. This rocking movement of the finger is imparted through a spring to an arm which engages the movable stop 33. The finger 78 is preferably rigidly attached to the upper end of a vertical shaft 79 and projects outwardly adjacent to the edge of the gear wheel 20, described above. This gear wheel 20, it will be observed, rotates with the slow moving pointer 8 and therefore, makes one complete revolution in the greatest possible measuring movement of the machine, that is to say, in measuring 12 yards. We provide means moving with this wheel 20 for actuating the finger and this means may consist of a plate 80 loosely mounted on the hub 21 and attached to the gear wheel 20 by a screw 81 passing through a small slot 82; the end of this plate 80 has an upwardly turned end or dog 83 in the path of which the finger 78 projects. The rocking shaft 79 extends downwardly past a substantially horizontal frame plate 84 so that its lower end is rotatably mounted in the base plate 2. Adjacent to the frame plate 84 the rock shaft carries a rigid frame plate or arm 85 (see Figs. 8 and 11), and loosely mounted on the rock shaft adjacent to this arm 85 we provide an arm 86 (see Fig. 8); this arm extends over, and its edge normally lies against the back edge of the movable stop plate 33. The arm 86 has a tail 87 which is connected by a coil spring 88 with a pin 89 on the bracket plate 85 (see Fig. 11). Now, at the limit of the measuring movement the dog 83 on the plate 80 (see Fig. 7) strikes against the right hand side of the finger 78 and this will rock the finger in an anti-clockwise direction on the rock shaft 79. This will give a corresponding rotation to the bracket plate 85 and exert a pull through the spring 88 upon the arm 86, thereby causing the end of the arm 86 to actuate the stop plate 33 which will arrest the rotation of the measuring roller. We provide means for adjusting the relation of the arm 86 with respect to the finger 78. In the present instance this is accomplished by means of adjusting means such as a screw 90 which is mounted in an ear 91 struck up from the bracket plate 85; the end of this adjusting screw 90 operates as a stop for the edge of the tail of the arm 86. Evidently by adjusting this screw, the angular relation of the finger 78 to the arm 86 can be adjusted as desired.

We provide means for normally holding the arm 86 up against the edge of the plate 33 and this means is preferably in the form of a spring which may be associated with a zero stop pawl which is also actuated by the finger 78 to effect the stopping of the indicating mechanism at zero in the returning movement. For this purpose the rock shaft 79 is provided with a rigid zero stop pawl 92 (see Fig. 7), the end of which normally lies quite near the path of movement of the shoulder 32. A small spring 93 connects this pawl 92, with the aforesaid plate 73 and this spring performs the double function of pulling the pawl 92 away from the zero stop wheel 31, and holding the arm 86 against the movable stop 33.

The marking means or lever 39 is normally held in an elevated position by means of a coil spring 94 (see Fig. 2).

We shall now describe the general mode of operation of the machine.

With the presser roller 49 in its raised position as illustrated in Figure 2, the edge of the fabric to be measured is introduced into the gap 50 and the end of the fabric is properly aligned with the side of the casing which lies adjacent to the knife 38. The thumb plate 62 is then pressed which operates to release the arm 61 from the latch 55 (see Fig. 13); this permits the springs 52, which are attached to the presser roller frame, to pull the presser roller 49 down against the fabric lying on the upper face of the measuring roller 4. The operator should examine the pointers or hands 8 and 9, to be sure that they are pointing to zero. The operator then pulls the fabric through the gap 5 and between the rollers 4 and 49. The rotation of the roller 4 imparts movement through the pinion 7 to the pinion 22 and to the gear wheel 23. The rotation of this gear wheel is imparted to pinion 29 which rotates gear wheel 30 on the horizontal shaft 15, (see Fig. 2). The shaft 15 drives the bevel gears 13 and 14, the former of which drives the spindle 12 which carries the fast moving pointer 9. Through the reduction gearing composed of gear wheels 16, 17, 19 and 20, the slow moving hand or pointer 8 is driven.

When the desired amount of cloth has been measured, the operator actuates the marking means, that is to say, he operates the lever 39 so that the blade 38 will co-operate with the fixed blade 41 to notch the edge of the fabric. (See Fig. 2.) When the lever 39 is operated in this way, its edge 59 engages the projecting end of the arm 58 and this raises the presser roller which is then latched automatically in its elevated position by the latch 55. In the relation of these parts shown in Fig. 12, the latch is represented in its raised position as though the thumb plate 62 were pressed in by the operator of the machine. The operation of the lever 39 also operates through the arm 41 and link 42 (see Fig. 9) to actuate the rock shaft 44 and cause the arm 47 to shift the clutch shaft 24 longitudinally; this opens the clutch composed of the clutch members 23 and 25. When the clutch is opened in this way, the spring 64 of the spring barrel 67 operates to rotate the shaft 70 through which the tension of the spring 64 will have been increased by the measuring movement of the indicating mechanism; through the governor shaft 70 and the pinion 70ᵃ on its shaft the gear wheel 30 is rotated in a direction to return the hands 8 and 9 to zero.

If it is attempted to measure more than the measuring limit of the machine, that is to say, more than 12 yards, the rotation of the measuring roller will be automatically arrested. This occurs in the following manner:

The dog 83 (see Fig. 3) strikes against the right hand side of the finger 78 and rocks the rock shaft 79 in an anti-clockwise direction. This rotates the bracket plate 85 in the same direction and exerts a pull through the spring 88 which is imparted to the arm 86, the end of which is in engagement with the movable stop 33 (see Figs. 8 and 10).

When the mechanism is returning to zero the dog 83 eventually strikes against the left side of the finger 78 and rocks it in a clockwise direction and this rotates the zero stop pawl 92 into the path of the notch 32 of the zero stop wheel 31 and stops the indicating mechanism in the zero position.

It is understood that the embodiment of the invention described herein is only one of the many embodiments our invention may take and we do not wish to be limited in the practice of our invention nor in our claims, to the particular embodiment set forth.

What we claim is:

1. In a machine of the kind described, the combination of a measuring roller, indicating mechanism, driving mechanism including a clutch through which the measuring roller actuates the indicating mechanism, said clutch having a sliding shaft for opening the same, marking means including a lever for marking the fabric to indicate the point where it is to be cut off, means actuated by said lever for sliding the clutch-shaft to open the clutch, and means for returning the indicating mechanism to zero when the clutch is open.

2. In a machine of the kind described, the combination of a measuring roller, indicating mechanism actuated thereby, a movable stop for arresting the rotation of the measuring roller, an arm mounted to rock on an axis for actuating said movable stop, a finger, means moving with the indicating mechanism for rocking said finger at the limit of the measuring movement and a spring for imparting a rocking movement, from the finger to said arm.

3. In a machine of the kind described, the combination of a measuring roller, indicating mechanism actuated thereby, a movable stop for arresting the rotation of the measuring roller, a rock-shaft, a finger attached to said rock-shaft, means moving with the indicating mechanism for rocking said finger at the limit of the measuring movement, an arm loosely mounted on said rock shaft, a spring for imparting a rocking movement to said arm, and a spring for normally holding said arm against said movable stop.

4. In a machine of the kind described, the combination of a measuring roller, indicating mechanism actuated thereby, a movable stop for arresting the rotation of the measuring roller, a rock-shaft, a finger carried rigidly thereby, means moving with the indicating mechanism for rocking said finger at the limit of the measuring movement, a bracket plate rigid with said rock-shaft, an arm loosely mounted on said rock-shaft adjacent to said bracket-plate for engaging said movable stop to actuate the same, and a spring for imparting movement from the bracket-plate to the arm when the finger is actuated at the limit of the measuring movement.

5. In a machine of the kind described, the combination of a measuring roller, indicating mechanism actuated thereby, a movable stop for arresting the rotation of the measuring roller, a rock-shaft, a finger carried rigidly thereby, means moving with the indicating mechanism for rocking said finger at the limit of the measuring movement, a bracket-plate rigidly carried by said rock-shaft, an arm loosely mounted on said rock-shaft for actuating the movable stop, a spring connecting the bracket-plate and said arm for imparting a rocking movement thereto from the finger, and a spring for normally holding the arm against the movable stop.

6. In a machine of the kind described, the combination of a frame including a substantially vertical frame plate, a measuring roller disposed on one side of said frame plate, indicating mechanism including gears located on the side of said frame plate opposite to the measuring roller, a movable stop mounted on said frame plate, means co-operating therewith for arresting the measuring roller at the limit of the measuring movement, a substantially horizontal frame plate, a substantially vertical rock shaft extending past said horizontal frame plate, a finger carried rigidly by said rock-shaft above the horizontal frame plate, means moving with the indicating mechanism for rocking said finger at the limit of the measuring movement, a spring associated with the said finger and an arm carried on said rock shaft below said horizontal frame plate and actuated by said finger through said spring, said arm engaging said movable stop to actuate the same at the limit of the measuring movement.

In testimony whereof, we have hereunto set our hands.

ANNIE MAE HOSCH,
*Administratrix of Walter E. Hosch, deceased.*
DOUGLAS TURNER.